United States Patent [19]

Ootsuka et al.

[11] Patent Number: 5,627,622
[45] Date of Patent: May 6, 1997

[54] TRIMMING CAMERA

[75] Inventors: Hiroshi Ootsuka, Sakai; Shigeru Wada, Kishiwada; Junichi Tanii, Izumi; Hiroshi Ueda, Habikino; Kohtaro Hayashi, Hirakata; Masaaki Nakai, Kawachinagano; Hiroyuki Okada, Sakai, all of Japan

[73] Assignee: Minolta Camera Kabushiki Kaisha, Osaka, Japan

[21] Appl. No.: 399,999

[22] Filed: Mar. 6, 1995

Related U.S. Application Data

[63] Continuation of Ser. No. 836,529, Feb. 18, 1992, abandoned.

[30] Foreign Application Priority Data

Feb. 19, 1991 [JP] Japan ................................. 3-024403

[51] Int. Cl.⁶ .............................. G03B 7/00; G03B 17/24
[52] U.S. Cl. .......................... 396/242; 396/60; 396/310
[58] Field of Search ..................................... 354/105, 106, 354/443

[56] References Cited

U.S. PATENT DOCUMENTS

| | | | |
|---|---|---|---|
| 4,639,111 | 1/1987 | Harvey | 354/106 X |
| 4,768,047 | 8/1988 | Taniguchi et al. | 354/446 X |
| 4,774,536 | 9/1988 | Inoue et al. | 354/106 |
| 4,855,780 | 8/1989 | Hayakawa | 354/432 |

Primary Examiner—W. B. Perkey
Attorney, Agent, or Firm—Burns, Doane, Swecker & Mathis, LLP

[57] ABSTRACT

In a camera having a function or recording a scope of printing (printing scope) in an exposed picture of a film, under a panoramic photography mode, that is, a mode in which the ratio of the horizontal dimension to the vertical dimension of a printing scope is larger than that of a standard picture from a film, an aperture is controlled to be smaller than in standard photography.

4 Claims, 10 Drawing Sheets

(a)

(b)

(c)

(d)

TRIMMING CAMERA

This application is a continuation of application Ser. No. 07/836,529, filed Feb. 18, 1992, now abandoned.

BACKGROUND OF THE INVENTION

1. Field of the Invention

The present invention relates to a camera which can specify the scope of printing in an exposed frame of a film.

2. Description of the Prior Art

A camera having a function of recording a scope of printing (printing scope) on a film is referred to as a trimming camera. So far a system has been provided in which a printing scope in an exposed picture of a film is recorded on a film and a trimming is performed in printing according to the recorded range.

Using the system, a part of the exposed picture is enlarged in printing. Therefore, even without a telephoto lens, a photograph is printed as if a telephoto lens had been used. When an oblong scope is specified as a printing scope, an oblong photograph like a panoramic photograph is printed.

Thus, even if a telephoto lens is not mounted in a camera, pseudo telephotography can be performed. And even if a camera does not have a function of panoramic photography, pseudo panoramic photography can be performed.

Further, a camera is known which calculates an aperture value and a time value for obtaining the proper exposure amount based on an object brightness and which controls the exposure according to the calculated aperture value and time value. Moreover, a camera has been provided which can select a combination of the aperture value and time value according to the focal length of a camera lens for obtaining the proper exposure amount among the plural combinations.

SUMMARY OF THE INVENTION

An object of the present invention is to provide a camera in which a combination of an aperture value and a time value proper to each photographic condition can be automatically set with use of the fact that a photographic condition changes according to the form of a printing scope. For example, when the form of the printing scope is oblong, it is usually scenery photographic in most cases. In scenery photography, it is desirable that the depth of field be deep. Therefore, in the present invention, when the printing scope is oblong, a combination of the aperture value and the time value, is selected so that the aperture can be controlled to be comparatively small.

Other objects and advantages of the present invention will become apparent from the detailed description to follow taken in conjunction with the appended claims.

DETAILED DESCRIPTION OF THE PREFERRED EMBODIMENT

An embodiment of a camera capable of panoramic photography in the present invention is described with reference to the accompanying drawings.

In the camera of the present embodiment, a zoom lens whose focal length changes in a range from 35 mm to 105 mm is mounted thereon. And the camera has an electronic zooming function. The electronic zooming function is for recording an electronic zooming magnification on a film during photography. In printing, a picture exposed on a film is enlarged according to the magnification which is made by the standard enlargement magnification multiplied by the electronic zooming magnification, and is printed on a sheet of standard size photographic paper. When the electronic zooming magnification is more than 1, the printed photograph is a part of the exposed picture which is magnified. Therefore, in the same manner as the above described trimming camera, an effect of pseudo telephotography can be achieved. The maximum magnification by electronic zooming is set at double. Therefore, it is possible to zoom in a range of a pseudo focal length (which is described later) from 35 mm to 210 mm by combining the optical zooming with electronic zooming.

Further, the camera of the present embodiment has a pseudo panoramic photography function. The pseudo panoramically photographing function is for recording on a film data showing the panoramic photography. A frame of a film which has the recorded data is enlarged double the regular enlargement magnification and is printed in a sheet of photographic paper whose horizontal dimension is double the standard photographic paper. Namely, a printed scope of a picture can be obtained by cutting the upper and bottom parts from the standard exposure scope of a film.

Figure 2:
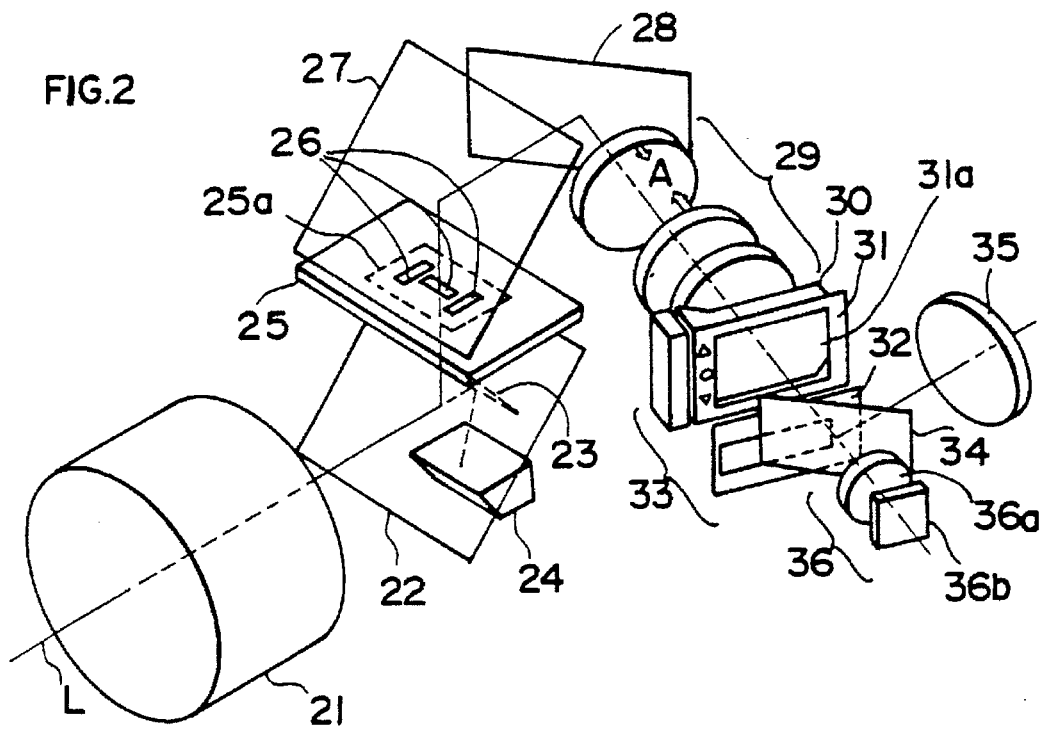
FIG. 2 is a structural illustration showing a camera lens and an optical system of a viewfinder of a camera in the present invention.

FIG. 2 is a structural illustration showing a camera lens and an optical system of a viewfinder of a camera in the present invention. 21 is a zoom lens which has a front lens group and a back lens group (not shown) therein. The front lens group or the back lens group moved in a lens barrel (not shown) in the direction of a light axis L along a guide in the lens barrel. When the front lens group or the back lens group moves and the two group's positions change, a focal length changes.

Behind the camera lens 21, a main mirror 22 is provided at an angle. The main mirror 22 is a partial transparent mirror, a half mirror, or another. The partial transparent mirror is formed by a reflecting mirror having a transparent part or a tiny hole at its center. The half mirror is formed by a translucent mirror at the whole or only its center. By the main mirror 22, a part of a light bundle from the camera lens 21 is reflected by an AF mirror 23 behind the main mirror 22 and is led to an AF module 24 and the rest of the light bundle is led to a finder system described later.

The AF module 24 is provided where the light bundle from the camera lens 21 forms the first image plane. The AF module 24 includes three image sensors for outputting three object image signals corresponding to distance measuring areas (AF1, AF2 and AF3, see FIG. 5). A distance to the object at each area is calculated according to a defocus amount of the object image and a position of a focusing ions in the camera lens.

On the other hand, the light bundle led to the finder system is led to a focusing glass 25 at first, which is provided where the first image is formed, and then, forms an image on the focusing glass 25. On the surface of the focusing glass 25, a mark 26 indicating the distance measuring areas is drawn. The above-mentioned first image goes through the mirrors 27 and 28, a relay system lens 29, and the condenser lens 30, and is formed as the second image. At a place where the second image is formed, a frame member 31 is provided. The relay system lens 29 is comprised of plural lenses and moves the predetermined lenses in the direction of an arrow A or the opposite direction in accordance with the directed electronic zooming direction so as to change an image magnification. By this structure, a photographer can observe an image which is to be printed. The frame member 31 is comprised of electro-optical elements such as LCD or ECD. The periphery of the frame member 31 intercepts the light, and by this light-intercepting portion, a frame 31a is formed.

In the case of photographing without using the electronic zooming, the image observed through the frame 31a corresponds with the entire object image formed on the focusing glass 25. On the other hand, as the electronic zooming is performed, the image magnification of the relay system lens 29 becomes larger. For example, when the electronic zooming magnification is two, the image observed through the frame 31a corresponds with the image in a range 25a encircled with a broken line on the focusing glass 25.

A panorama mode frame 32 obstructs the optical path in a panoramic photography mode (hereinafter referred to as the PAN mode), and when the PAN mode frame 32 is not used, that is, in a standard photography mode, it can be drawn back. The PAN mode is for taking an oblong printed photograph such as a panoramic photograph by cutting upper and lower parts of a picture and making an aspect ratio, that is, a ratio of the horizontal dimension to the vertical dimension, larger than in the case of the standard photography mode.

The image observed through the frame 31a is led to an eyepiece 35 through a mirror 54. And through the eyepiece 35, the object image is observed. The image observed through the eyepiece 55 is magnified the same amount in two cases. One is a case where the magnification of electronic zooming is made larger than 1 so that the magnification of the relay system lens 29 would be larger. The other is a case where the focal length of the optical zoom lens 21 is made longer so that the image magnification would be larger. At this time, the mark 26 indicating the distance measuring areas is drawn in the predetermined size on the focusing glass 25 of the first image plane. Therefore, the mark 26 always appears in the predetermined size and position in the optical zooming, while in the electronic zooming it appears in the different size and position in accordance with the magnification of the electronic zooming because the mark 26 is magnified by the delay system lens 29 (see FIGS. 5 (a) to (c)).

Figure 5:
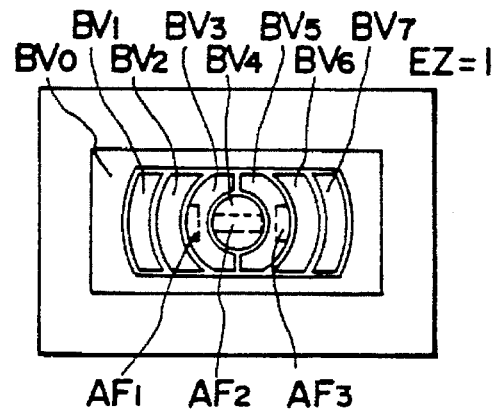
FIG. 5 is an illustration showing a change of a positional relation between distance measuring areas and light measuring areas.
Figure 5:
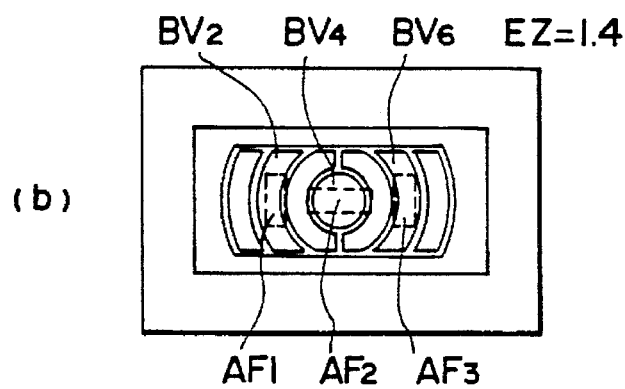
Figure 5:
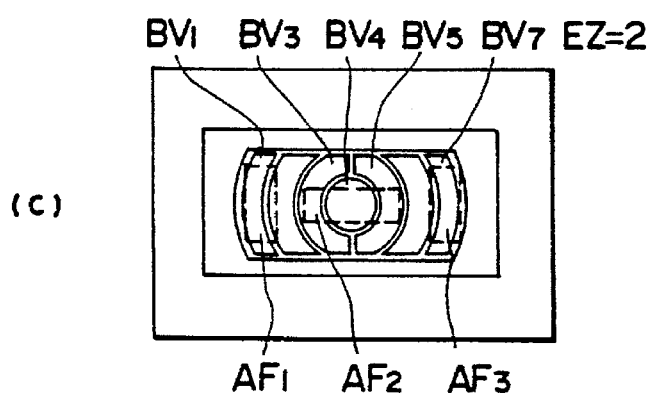
Figure 5:
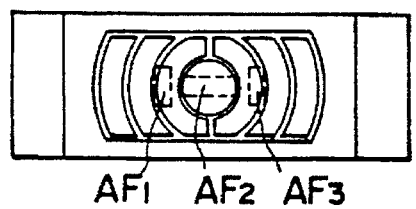

The above-mentioned mirror 34 is a half mirror that leads a part of light bundle from the image on the second image plane to a light measuring optical system 36. The light measuring optical system 36 is comprised of a light measuring lens 36a and a light-receiving element 36b. The light measuring lens 36a reforms the image on the light-receiving element 36b. As shown in FIG. 5, the light-receiving element 36b is divided corresponding to the predetermined areas, For example, areas BV0 to BV7, on the second image plane. The light measuring area is divided into eight areas, such as the areas BV0 to BV7 so as to correspond to the above-mentioned distance measuring areas at each magnification of the electronic zooming. Thus, whichever of the electronic zooming and the optical zooming is performed, the light measuring areas appear always in the predetermined size and position against the observed field of view, because the position of the light measuring area is fixed against the second image plane. A signal received at the light-receiving element is used for exposure calculating for exposure control.

The above-mentioned main mirror 22 and the AF mirror 23 move away from optical axis in response to a release signal. Accordingly, the object light is able to reach the photosensitive member such as the film and imaging device (not shown) at release time. Further, as described later, at the same time as exposure, information necessary at the printing time, such as electronic zooming magnification and PAN mode selection, are recorded on a proper part of a film, outside of the exposed scene, by the later described EZPAN information recording circuit 11 (see FIG. 1). if a camera is a kind where the photosensitive member is comprised of imaging devices and a photographed picture image is recorded in an electronic medium, the information can be recorded in the electronic medium by the EZPAN information recording circuit 11.

Figure 1:
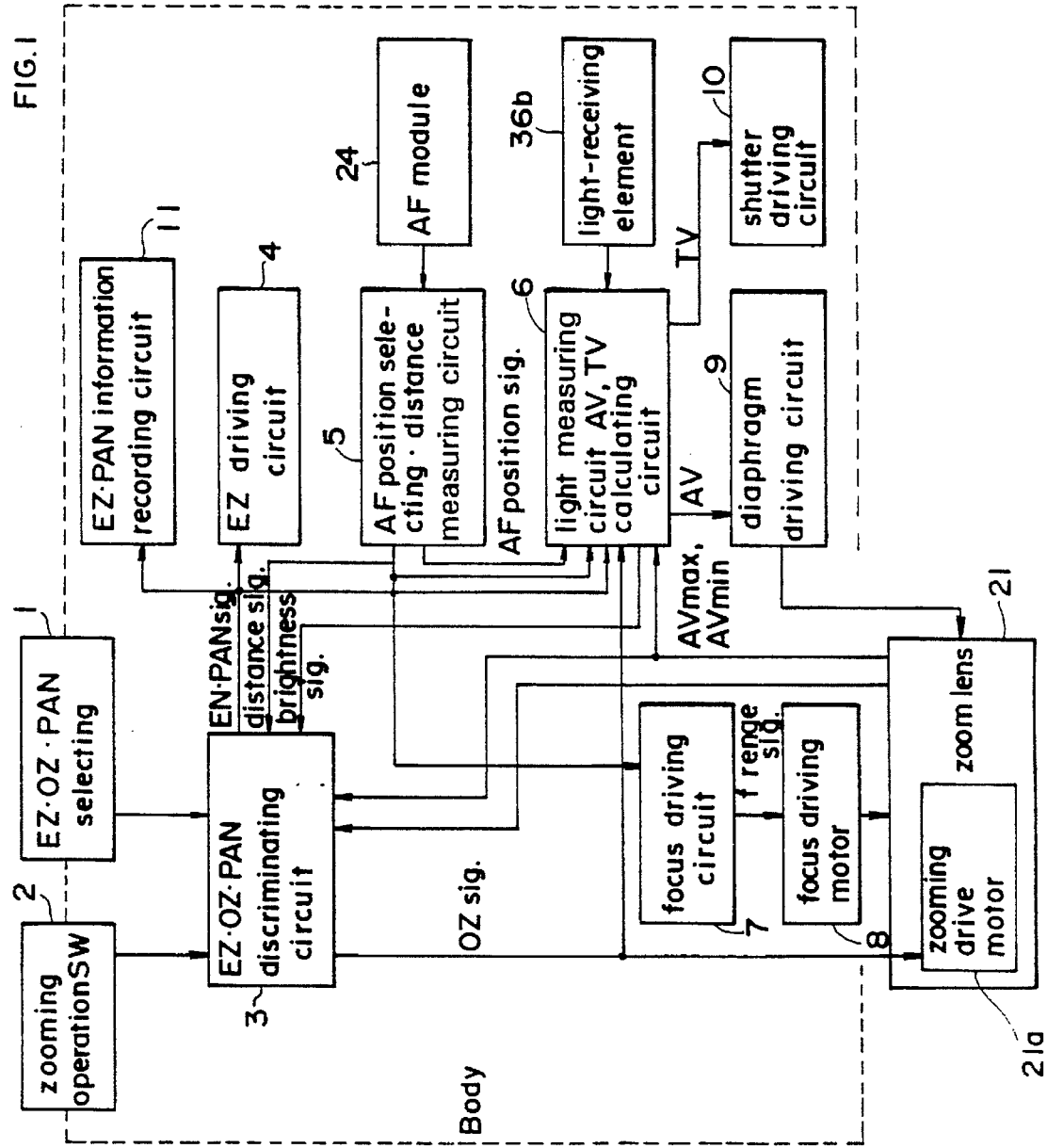
FIG. 1 is a system structural illustration showing a controlling system of a camera in the present invention.

FIG. 1 is a system structural illustration showing a controlling system of a camera according to the present invention.

FIG. 1 is a structural illustration of a camera having both of the functions of optical zooming (hereinafter referred to as OZ) by the zoom lens and electronic zooming (hereinafter referred to as EZ) by pseudo zooming. This camera also has a function of the above-mentioned panoramic photography (hereinafter referred to as PAN).

An EZ.OZ.PAN selecting switch 1 selects a mode From the EZ mode, the OZ mode and the PAN mode. When the OZ mode or the EZ mode is selected, a zooming operation switch 2 controls zooming operation in each mode. According to the signals from the EZ.OZ.PAN selecting switch 1 and the zooming operation switch 2, an EZ.OZ.PAN discriminating circuit S outputs a signal into a predetermined circuit portion according to the selected mode. When the OZ mode is selected, an operating signal from the zooming operation switch 2 is outputted into a zooming drive motor 21a which drives a zoom liens 21 (that is, the camera lens 21 in FIG. 2). The zoom lens 21 is driven so that the focal length of the optical zoom lens 21 would correspond to the zooming operation. When the EZ mode is selected, an operating signal from the zooming operation switch 2 is outputted into an EZPAN information recording circuit 11 and an EZ driving circuit 4. In the EZPAN information recording circuit 11, the electronic zooming magnification which is to be recorded is changed according to the operating signal. In the EZ driving circuit 4, the above-mentioned relay system lens 29 is driven so as to correspond with the changed electronic zooming magnification. When the FAN mode is selected, the selecting signal is outputted into the EZ driving circuit 4. Then, the relay system lens 29 is driven so that the magnification of the electronic zooming is 1. At this time, the frame 32 showing the border or the photographed scene in the PAN mode moves into the finder optical system.

A camera of the present embodiment has an automatic mode (hereinafter referred to as AUTO mode). When the AUTO mode is selected, the better mode of the EZ mode and the OZ mode is selected according to the distance data from the AF position selecting/distance measuring circuit 5 and the brightness data from a light measuring circuit 6. Alternatively the zooming control can be performed by the combination of the EZ mode and the OZ mode.

The AF position selecting/distance measuring circuit 5 takes in each light-receiving signal, which is in each area of the three distance measuring areas, from the AF module 24. According to the light-receiving signal, a distance measuring value in each distance measuring area is calculated. Then, the one of distance measuring values, for example the value indicating the closest area among the three areas, is selected, and the distance signal is outputted to a focus driving circuit 7 for focusing of the zoom lens 21 based on the selected distance measuring value. The focus driving circuit 7 outputs a signal which shows the driving amount corresponding to the inputted distance signal, for example the pulse number, to the focus driving motor 8.

The light measuring circuit 6 calculates the exposure control brightness according to Table 1, which is described later, on the basis of each brightness signal, the AF position information and the distance data. The brightness signal is inputted from the light-receiving element 36b divided in correspondence with the areas BV0 to BV7 shown in FIG. 5. The AF position information and the distance data are inputted from the AF position selecting/distance measuring circuit 5. The calculated exposure control brightness is, for example, a light measuring value in a light measuring area which corresponds to the selected distance measuring area. Or the exposure control brightness can be an average value of plural light measuring values calculated after weighting comparatively heavily the light measuring value in the light measuring area which corresponds to the selected distance measuring area. The contents of Table 1 is memorized in a memory of the light measuring circuit 6. The light measuring circuit 6 also has an AVTV calculating circuit for calculating an aperture value AV and a time value TV on the basis of the exposure control brightness obtained by the above-mentioned method. The calculated aperture value AV and the time value TV are inputted into a diaphragm driving circuit 9 and a shutter driving circuit 10 respectively. And then, by means of both circuits, the diaphragm and the shutter (not shown) are driven to take a photograph. The information about the selection of the EZ and PAN modes, the EZ zooming ratio and such is inputted into the EZPAN information recording circuit 11. Such information is recorded on a part of a film which is outside of the scene being photographed.

Figure 3:
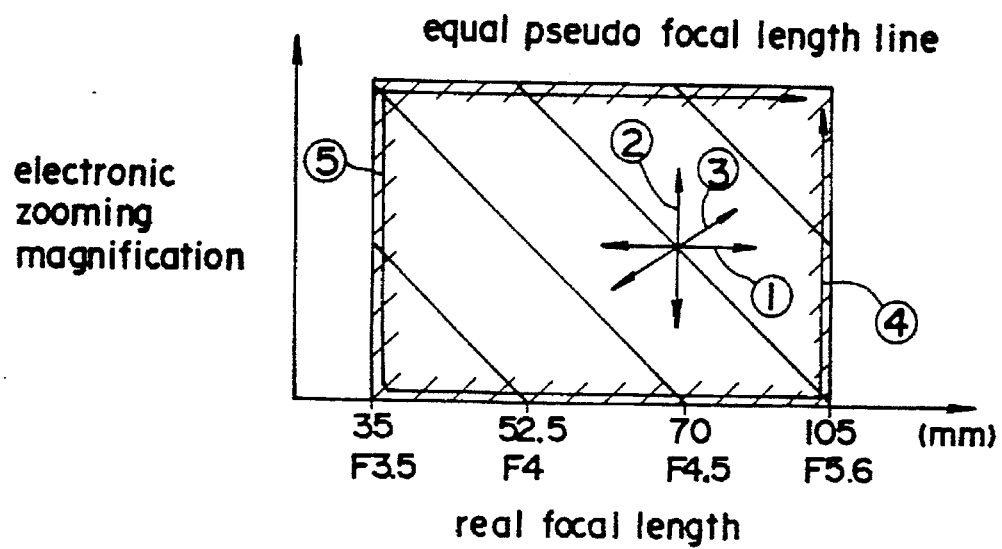
FIG. 3 is an illustration showing zooming conditions.

FIG. 3 is an illustration showing zooming conditions. In FIG. 3, the horizontal axis shows a real focal length of a zoom lens and the vertical axis shows a magnification of the electronic zoom. Under each real focal length, the F number for a fully open aperture is written. As described above, the zoom lens 21 can change its focal length in a range from 35 mm/F 3.5 to 105 mm/F 5.6, while the electronic zooming can change its zooming magnification in a range from one to two. Therefore, it is possible to set the zooming operation in a range shown with slanted lines. For example, in the case of "OZ=35 mm, EZ =2" and the case of "OZ=70 mm EZ=1" each pseudo focal length is the same because in both cases the photographic angle of view is the same. When the pseudo focal length is fleq, the following equation can exist:

$$fleq = OZ \times EZ \quad (1)$$

In the above example, the pseudo focal length is 70 mm in both cases. And the larger the OZ value becomes, the larger the open F number becomes, for example, when OZ=35 mm, F=3.5, and when OZ=70 mm, F=4.5. This is because of a characteristic of the zoom lens.

In FIG. 3, ① shows a changing direction of zooming only with the optical zooming, ② shows one only with the electronic zooming EZ, and ③ shows one with the combination of the optical zooming and the electronic zooming. A plurality of lines having a negative inclination shows respectively equal pseudo focal length lines showing combinations of the OZ value and the EZ value corresponding to a predetermined pseudo focal length.

Figure 4:
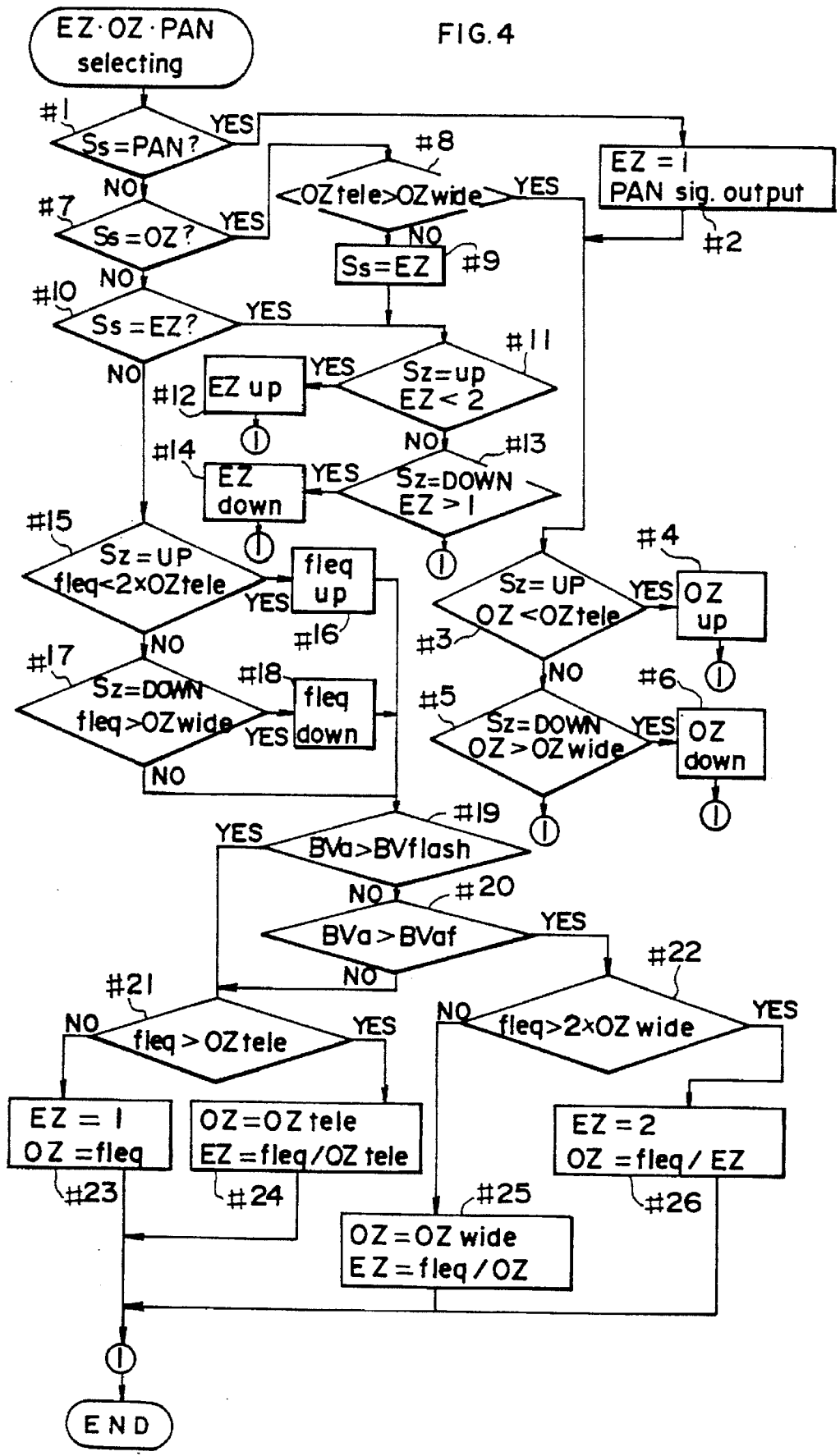
FIG. 4 is a flowchart showing an EZ.OZ.FAN selecting routine.

FIG. 4 is a flowchart showing the EZ.OZ.PAN selecting routine.

In the flowchart, "Sz" refers to an operation of the zooming operation switch 2, and operations "UP", "DOWN" and "NO" are possible. "Ss" identifies a mode selected by the EZ.OZ.PAN selecting switch 1 among the EZ mode, the OZ mode and the PAN mode. OZtele shows the longest focal length of the zoom lens 21 and OZwide shows the shortest focal length of the zoom lens 21. OZtele and OZwide are inputted from the zoom lens 21.

First, the EZ.OZ.PAN selecting switch 1 discriminates which mode is selected among the PAN mode, the OZ mode and the EZ mode (in steps #1, #7 and #10).

When the "Ss" signal is the PAN mode (when step #1 is "YES"), the EZ value (that is, the magnification by the electronic zooming) is set at 1 and the PAN signal is generated and outputted to the EZ driving circuit 4 and the EZPAN information recording circuit 11 (at step #2). Then, the program goes to step #3. In the PAN mode, only the OZ value is changed because only the optical zooming is possible. That is, when the "Sz" signal is "UP" and the OZ value is less than OZtele (when step #3 is "YES"), the OZ value is increased according to the "Sz" signal (in step #4). By inputting this OZ value into the zooming drive motor 21a, the zoom lens 21 is driven toward the telephoto side. When the "Sz" signal is "DOWN" and the OZ value is more than OZwide (when step #5 is "YES"), the OZ value is lowered according to the "Sz" signal (in step #6). By inputting this OZ value into the zooming drive motor 21a, the zoom lens 21 is driven toward the wide angle side.

When the "Ss" signal indicates the OZ mode (when step #7 is "YES"), a determination is made whether or not the mounted lens is a zoom lens (in step #8). This determination is based on whether or lot the relation between the longest focal length OZtele and the shortest focal length OZwide is OZwide<OZtele. When the mounted lens is a zoom lens (when step #8 is "YES"), the program goes to the step #3. Then, the same as the case of the PAN mode, the OZ value is raised or lowered according to the "UP" or "DOWN" of the "Sz" signal (in the steps #3 and #4, or #5 and #6). This operation corresponds to a change in the direction ① in FIG. 3. When the mounted lens is not a zoom lens but a single focal length lens (when step #8 is "NO"), the "Ss" signal is switched to the EZ mode (in step #9), and the program goes to step #11.

When the "Ss" signal is the EZ mode (when the step #10 is "YES"), the program goes to step #11. In the step #11, when the "Sz" signal is "UP" and the EZ value is less than 2 (when step #11 is "YES"), the EZ value is raised according to the "Sz" signal (in step #12). Then, the EZ value is inputted to the EZPAN information recording circuit 11 and the EZ driving circuit 4. By inputting this EZ value into the EZ driving circuit 4, the relay system lens 29 is driven. When the "Sz" signal is "DOWN" and the EZ value is more than i (when step #13 is "YES"), the EZ value is lowered according to the "Sz" signal (in step #14). Then, the EZ value is inputted to the EZPAN information recording circuit 11 and the EZ driving circuit 4. By inputting this EZ value into the EZ driving circuit 4, the relay system lens 29 is driven. This operation corresponds to a change in the direction ② in FIG. 5.

When the "Ss" signal is neither the PAN mode, the OZ mode nor the EZ mode (when the step #10 is "NO"), the AUTO mode is selected, so that the program goes to step #15. In the AUTO mode, the best combination is selected automatically among the combinations of the EZ value and the OZ value in which the pseudo focal length fleq is constant.

In the AUTO mode, when the "Sz" signal is "UP" and fleq <2×OZtele (when step #15 is "YES"), the pseudo focal length fleq is increased (in step #16). To the contrary, when the "Sz" signal is "DOWN" and OZwide<fleq (when step #17 is "YES"), the pseudo focal length fleq is lowered (in step #18). Then, a combination of the OZ value and the EZ value at the pseudo focal length fleq is determined (after step #19).

Hereinafter, the OZ value and the EZ value and a characteristic of a camera of the present embodiment are described. Considering the case of fleq=70 mm, the OZ value and the EZ value can be set between the combination ① OZ=35 mm and EZ=2 and the combination ② OZ=70 mm and EZ=1. When ① is set, the F number is small and the distance measuring AF area is wide. However, an enlargement ratio is large in printing since EZ=2, so that an image blur is noticeable. Therefore, ① is not suitable for the case of slow shutter speed or low contrast, because high precision is required for focus adjustment.

Now back to the flowchart in FIG. 4, in step #19, an average value BVa and a flash brightness BVflash are compared. The average value BVa is an average value of the light amount received at each light-receiving element 36b which is divided into the light measuring areas BV0 to BV7. The flash brightness BVflash is a brightness level at which flash photography is required. It is about 5 EV, for example. When the average brightness BVa is not exceeding the flash brightness BVflash (when step #19 is "NO"), the program goes to step #20. When the average brightness BVa is over the flash brightness BVflash (when step #19 is "YES"), the program goes to step #21.

When BVa>BVflash (when step #19 is "YES"), it is determined whether or not OZtele<fleq. When fleq<OZtele (when step #21 is "NO"), the EZ value is set fixedly at the minimum value 1 because of the above-mentioned reason, so that the zooming is operated only by the optical zooming. The OZ value is calculated by the above-mentioned equation (1), that is, OZ=fleq/1 (in step #23). When OZtele<fleq (when step #21 is "YES"), the OZ value is set at the maximum value OZtele. The EZ value is calculated by the equation (1), that is, EZ=fleq/OZtele (in step #24). The zooming operation in this case is performed along the zooming line ④ in FIG. 3. In this manner, the EZ value is set as small as possible, so that an emphasis of a blur by the electronic zooming in a photograph is reduced.

When BVa≦BVflash (when step #19 is "NO"), the average brightness BVa is further compared with an AF brightness BVaf (in step #20). The AF brightness BVaf is a brightness level at which distance measuring can be carried out with a high degree of precision. It is about 0 EV, for example. When BVa >BVaf, in the case of using a flash, it is better to set the shutter speed high so as to reduce the influence of the camera shake. On the other hand, in the zoom lens, the smaller the OZ value becomes, the larger an open aperture value. Therefore, the open aperture value is set large by setting the OZ value as small as possible so as to set the time value TV as large as possible. Also in the case of not using the flash, it is suitable to set the F number as small as possible to take a photograph of a far object. Therefore, it is also desirable to set the OZ value as small as possible.

When BVa≦BVflash and BVa≦BVaf, if the EZ value is large, not only the precision in the focus adjustment is bad, but also the blur is emphasized in a photograph. Therefore, it is better to set the EZ value as small as possible in this case. When BVa≦BVaf (when step #20 is "NO"), the program goes to step #21 so as to process the same routine as the case of BVa>BVflash. When BVa>BVaf (when step #20 is "YES"), the program goes to step #22.

When BVa>BVaf (when the step #20 is "YES"), it is determined whether or not 2×OZwide<fleq. When fleq <2×OZwide (when step #22 is "NO"), the OZ value is set at the minimum value OZwide because of the above-mentioned reason. The EZ value is calculated by the above-mentioned equation (1), that is, EZ=fleq/OZwide (in step #25). When 2×OZwide<fleq (when step #22 is "YES"), the EZ value is set at the maximum value 2 because of the same reason as mentioned above. The OZ value is calculated by the equation (1), that is, OZ=fleq/2 (in step #26). The zooming operation in this case is performed along the zooming line ⑤ in FIG. 3.

In the present embodiment, when the average brightness BVa is almost the same as the flash brightness BVflash or the AF brightness BVaf, the zooming line often changes between ④ and ⑤ in FIG. 3 only by a slight change of the average brightness BVa which occurs by a little change of the direction of a camera, for example. As a result, the zoom lens 21 or the relay system lens 29 is driven a great amount. Therefore, it is possible to set a middle zooming line between the zooming lines ④ and ⑤ in FIG. 5 near the above-mentioned brightness value BVflash or BVaf and to select this middle zooming line. The middle zooming line is, for example, a straight line which connects a point of OZ=35 mm and EZ=1 and a point of OZ=105 mm and EZ=2 in FIG. 3. By this operation, the driving amount of the zoom lens 21 or the relay system lens 29 can be reduced.

In a camera of the present embodiment, a multi light measuring system is used. As shown in FIGS. 2 and 5, when the electronic zooming is performed, that is, the relay system lens 29 is operated, the light measuring areas do not change but the distance measuring areas change in their sizes and positions according to the electronic zooming. FIG. 5 shows light measuring patterns which can achieve a proper exposure control value even if the positional relation between the distance measuring areas and the light measuring area changes. In FIG. 5, (a) shows the case of EZ=1, (b) shows the case of EZ=1.4 and (c) shows the case of EZ=2 In FIG. 5 (a), the area AF1 corresponds to the area BV3, the area AF2 corresponds to the area BV4, and the area AF3 corresponds to the area BV5. When the EZ value is 1.4 as in FIG. 5 (b), the distance measuring area is magnified, and the area AF1 corresponds to the area BV2, the area AF2 corresponds to the area BV4 and the area AF3 corresponds to the area BV6. When the EZ value is 2 as in FIG. 5 (c), the area AF1 corresponds to the area BV1, the area AF2 corresponds to the areas BV3, BV4 and BV5, and the area AF3 corresponds to the area BV7. By this correspondence of the selected distance measuring area to the light measuring area, the position of an object can be detected on the basis of the distance measuring value at each distance measuring area, and exposure control can be performed based on the light measuring value at the light measuring area corresponding to the detected position of the object. Therefore, even in rear-light photographic conditions, for example, proper exposure control for the object can be performed. FIG. 5 (d) shows a corresponding relation between the distance measuring areas and the light measuring areas in the PAN mode.

Figure 6:
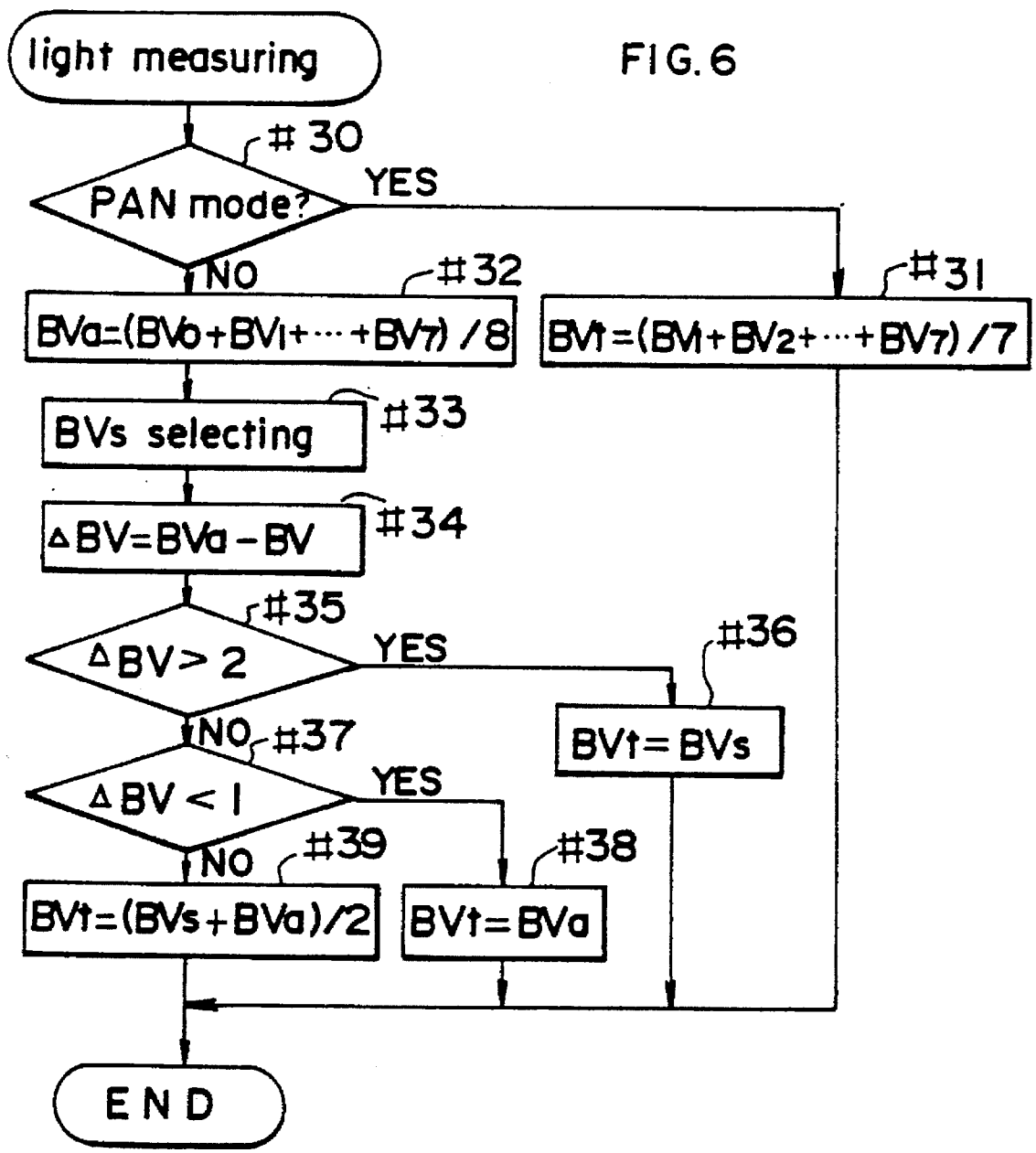
FIG. 6 is a flowchart showing a light measuring routine in a multiple light measuring system.

A light measuring routine is described referring to FIG. 6 hereinafter.

In step #30, a determination is made whether or not the PAN mode is selected by the EZ.OZ.FAN selecting switch 1. When the PAN mode is selected (when step #30 is "YES"), it is desirable to measure the light amount in the whole area of the picture on average, because many photographic conditions in the PAN mode are scenery photography, an assembly photography of people and scenery and such. Therefore, an average value of the light amount received at each light-receiving element 35b is set as an exposure control brightness BVt (in step #31). The light-receiving element 36b is divided into the light measuring areas BV1 to BV7.

When the selected mode is not the PAN mode, namely, it is a standard photographing mode (when step #30 is "NO"), a partial metering such as spot metering or center weighted metering is performed. First, the program goes to step #32. An average brightness BVa of the light amount received at each light-receiving element 36b, which is divided into the light measuring areas BV1 to BV7, is calculated (in step #32). This calculated average value BVa is used for calculating the later described brightness correcting value ΔBV. Then, an object brightness BVs is selected referring to the following Table 1.

TABLE 1

| AF area | BVs selecting table EZ value | | |
|---|---|---|---|
| | 1–1.2 | 1.2–1.7 | 1.7–2.0 |
| AF1 | BV3 | BV2 | BV1 |
| AF2 | BV4 | BV4 | (BV3 + 2xBV4 + BV5)/4 |
| AF3 | BV5 | BV6 | BV7 |

Table 1 shows a relation between the distance measuring area selected in each EZ range and the light measuring area corresponding to the distance measuring area. As described above with FIGS. 5 (a) to (c), the distance measuring area is magnified according to the EZ value, while the light measuring area is fixed. Therefore, the corresponding relation between both areas is different for every range of the EZ value as shown in Table 1, since it changes according to the EZ value. In the range of the EZ value 1.7 to 2.0, the area AF2 corresponds to the areas BV3, BV4 and BV5 at the same time, as shown in FIG. 5 (c). in this case, because the center area BV4 is half of the other areas, the average value is calculated after doubling the light measuring value in the center area BV4.

In step #33, the corresponding BV area, that is, the object brightness BVs, is selected from Table 1. Then, it is determined whether or not it is a rear light condition. Namely, ΔBV=BVa–BVs is calculated according to the values of the average brightness BVa and the object brightness BVs (in step #34). After that, a determination is made whether the BV calculated value ΔBV is more than 2 (in step #35). When BV is more than 2 (when the step #35 is "YES"), a determination is made that it is a strong rear-light condition, so that the brightness BVs is set as the exposure control brightness BVt (in step #35).

When the value ΔBV is less than 1 (when step #37 is "YES"), it is judged that it is a front light condition, so that the average brightness BVa is set as the exposure control brightness BVt (in step #38). When the value ΔBV is between 1 and 2 (when the step #37 is "NO"), it is judged that it is a weak rear-light condition, so that the program goes to step #39. In step #39, the exposure control brightness BVt is calculated by (BVs+BVa)/2 for obtaining the center weighted brightness rather than the averaged brightness. The exposure control brightness BVt calculated like this is used in a calculating routine which is for calculating the aperture value AV and the time value TV.

The routine for calculating the aperture value AV and the time value TV is described with FIGS. 7 and 8 hereinafter.

Figure 7A:
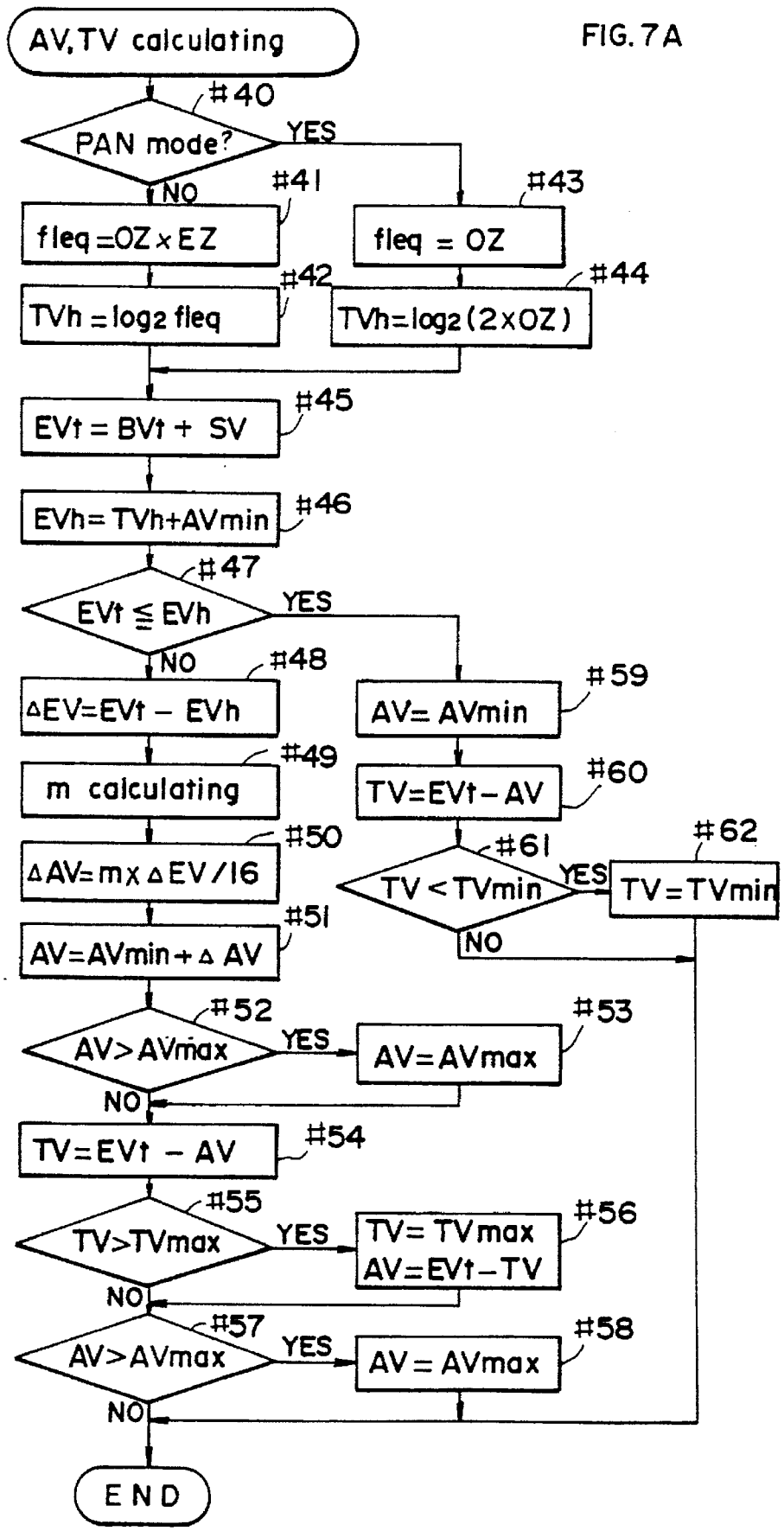
FIGS. 7A, 7B and 7C comprise a flowchart showing a routine of calculation of an aperture value AV and a time value TV.

In a flowchart of FIG. 7A, TVh is a lower limit time value at which camera shake will not blur a photograph. When a shutter speed is slower than the shutter speed corresponding to the lower limit time value TVh, it is determined that the effect of camera shake will influence the photograph to be taken. Generally, the shutter speed corresponding to TVh is denoted by a reciprocal of the focal length of a camera lens. However, when the electronic zooming of EZ>1 is used in photographing in the present embodiment, the printed photograph is enlarged as many times as the EZ value, so that the blur of the photograph caused by camera shake becomes remarkable. Therefore, a reciprocal of [the focal length of a camera lens]×[the EZ value], that is, a reciprocal of the fleq, is used for denoting a lower limit shutter speed at which camera shake will not blur a photograph. The lower limit time value TVh is denoted by an apex value of the lower limit shutter speed, and is calculated by the equation TVh= log2fleq In the PAN mode, an angle of view of the longitudinal direction is the same as that of the case of EZ=1. So, the equation fleq=OZ value is fulfilled. The enlargement magnification in printing of a photograph in the PAN mode is denoted as α. Since the blur of a photograph by camera shake becomes remarkable as described above, the lower limit time value TVh is expressed as follows:

$$TVh=\log2(\alpha \times fleq)=\log2(\alpha \times OZ\ value)$$

In the present embodiment, α is set at 2.

Figure 8A:
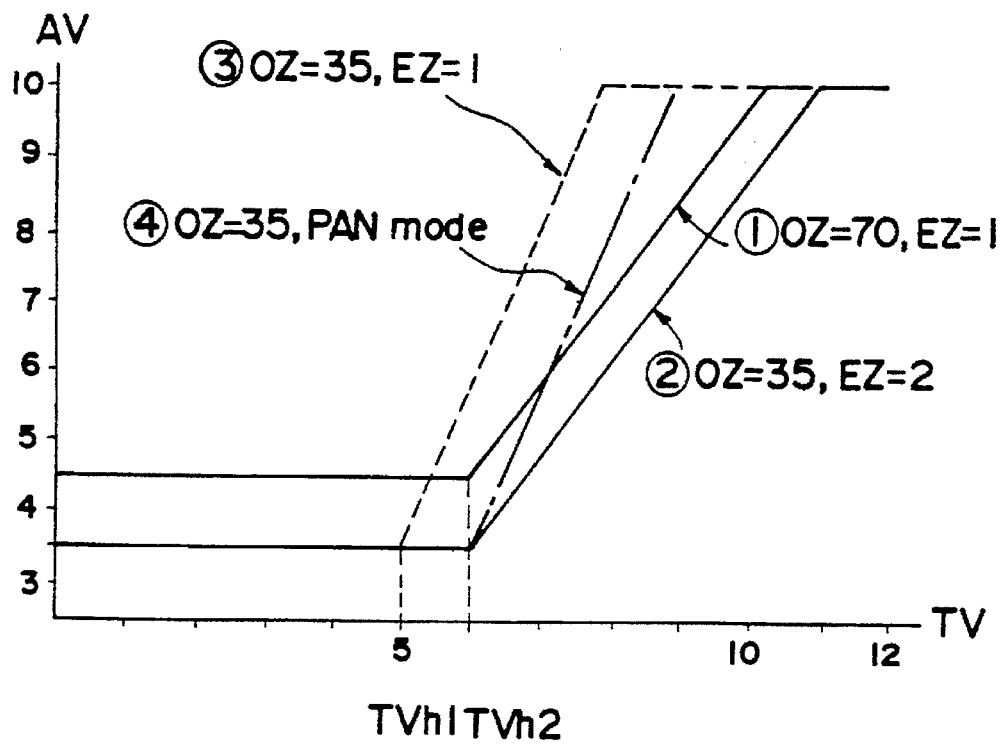
FIGS. 8A and 8B are program graphs showing a combination of an aperture value AV and a time value TV.

FIG. 8A shows a program graph in which the vertical axis shows an aperture value AV and the horizontal axis shows a time value TV. The program graph in FIG. 8A is for the case of the zoom lens shown in FIG. 5. In lines ① and ② the pseudo focal lengths fleq are the same (fleq=70 mm). So, the lower limit time values TVh are set at TVh2 and the slopes m described later are also the same in both lines. But open aperture values AVmin are not the same because the OZ values are different. In line ③, OZ=35 mm and EZ=1 , so that the lower limit time value TVh is set at TVh1 lower than TVh2 in lines ① and ②, and the slope m is larger than that of the lines ① and ②. In line ④, OZ=35 mm, the mode is the PAN mode, the slope m is same as that of the line ③, and the lower limit time value TVh is set at TVh2 as same as the line ②.

In FIG. 7A, a determination is made first whether or not the PAN mode is selected by the EZ.OZ.PAN selecting switch 1 (in step #40). When it is not the PAN mode (when step #40 is "NO"), a decision is made that it is a standard mode (that is, the OZ mode or the EZ mode), and the pseudo focal length fleq is calculated. Then, the lower limit time value TVh for the calculated pseudo focal length fleq is calculated by the above-mentioned equation (in steps #41 and #42).

When the PAN mode is selected (when step #40 is "YES"), the OZ value is set as a value of the pseudo focal length fleq. And the lower limit time value TVh is calculated by the above-mentioned equation on the basis of the enlargement magnification 2 in printing of a photograph in the PAN mode (in steps #43 and #44).

Thus, in the present embodiment, when the PAN mode is selected, the pseudo focal length fleq and the lower limit time value TVh are set according to an algorithm different from that of the other modes, namely, the OZ mode, the EZ mode and the AUTO mode. Therefore, a program line in the PAN mode (for example, the line ④ in FIG. 8A) is different from that of the other modes (for example, the lines ① to ③ in FIG. 8A).

Then, an exposure control value EVt is calculated according to the exposure control brightness BVt and a film sensitivity SV (in step #45), and a lower limit exposure value EVh is calculated according to the lower limit time value TVh and the open aperture value AVmin (in step #46).

In step #47, a determination is made whether the exposure value EVt is larger or the lower limit exposure value EVh. When EVt>EVh (when step #47 is "NO"), the aperture value AV and the time value TV become larger with increasing brightness, using the point of AVmin and TVh as a starting point. The increasing amount of the aperture value AV and the time value TV is determined by the slope m, as described later. The slope m is set so as to be small when the pseudo focal length fleq is long and so as to be large when the pseudo focal length fleq is short. The slope m can be calculated. In the present embodiment, the slope m corresponding to the pseudo focal length fleq is calculated in advance and is recorded. Table 2 shows the calculated values which are recorded in this manner.

TABLE 2

| "m" value calculating table | |
|---|---|
| fleq | m |
| –35 | 12 |
| 32–45 | 11 |
| 45–64 | 10 |
| 64–90 | 9 |
| 90–180 | 8 |
| 180–360 | 7 |
| 360– | 6 |

As shown in Table 2, the value of the slope m is set in inverse proportion to the pseudo focal length fleq. This is because many photographing conditions are scenery photography, assembly photography of people and scenery, and such when the pseudo focal length is short, while many photographing conditions are people photography, sport photography, and such when the pseudo focal length is long. That is, it is desirable to control the aperture to be stopped down so that the depth of field can be deep for the purpose of making the whole range of the picture clear when the pseudo focal length is short, while it is desirable to control the aperture to be opened and the shutter speed to be increased so that the background of the object should be bluffed much more and that a blur caused by the movement of the object can be reduced when the pseudo focal length is long. Therefore, the slope m is made large when the pseudo focal length fleq is short, and the slope m is made small when the pseudo focal length fleq is long. Therefore, when the pseudo focal length is short the aperture value AV is increased a greater amount (the aperture is stopped down more) with increasing brightness than for the case in which the pseudo focal length is long. By setting the slope m like this, the best combination of the aperture value and the time value can be obtained for every pseudo focal length fleq.

In step #48 in FIG. 7A, the difference between the exposure control value EVt and the lower limit exposure value EVh is calculated as an exposure correcting value ΔEV. The lower limit exposure value EVh corresponds to a combination of the open aperture value and the lower limit time value TVh. In step #49, the slope m is set according to Table 2. With the exposure correcting value ΔEV and the slope m, an aperture correcting value ΔAV is calculated by m×ΔEV/16 (in step #50). By addition of the calculated aperture correcting value ΔAV and the open aperture value AVmin, an aperture control value AV is calculated (in step #51).

In step #52, the calculated aperture control value AV is compared with the maximum aperture value AVmax. When AV>AVmax (when step #52 is "YES"), the aperture control value AV is changed into the maximum aperture value AVmax (in step #53). When AV≦AVmax (when step #52 is "NO"), the program goes to step #54.

In step #54, a time control value TV is calculated by EVt–AV. When the calculated time control value TV is more than the maximum time value TVmax (when step #55 is "YES"), the time control value TV is changed into the maximum time value which can be controlled mechanically and the aperture control value is calculated again (in step #56). When the calculated time control value TV does not exceed the maximum time value TVmax (when step #55 is "NO"), the program goes to step #57. The calculated aperture value AV is again compared with the maximum aperture value AVmax (in step #57). When AV≦AVmax (when step #57 is "NO"), the control aperture value AV is used as it is. When AV>AVmax (when step #57 is "YES"), the maximum aperture value AVmax is used as the control aperture value AV (in step #58).

When EVt≦EVh (when step #47 is "YES"), it is desirable to increase the time value (that is, to increase the shutter speed) as possible, so that the open aperture value AVmin is set as the aperture control value AV (in step #59). The time value TV is calculated by EVt–AV (in step #60). When the time control value TV calculated like this is not less than the minimum time value TVmin which is mechanically the lower limit (when step #61 is "NO"), the time control value TV is set as it is. When the time control value TV is less than the minimum time value TVmin (when the step #61 is "YES"), the minimum time value TVmin is set as the time control value TV (in step #62).

Figure 8B:
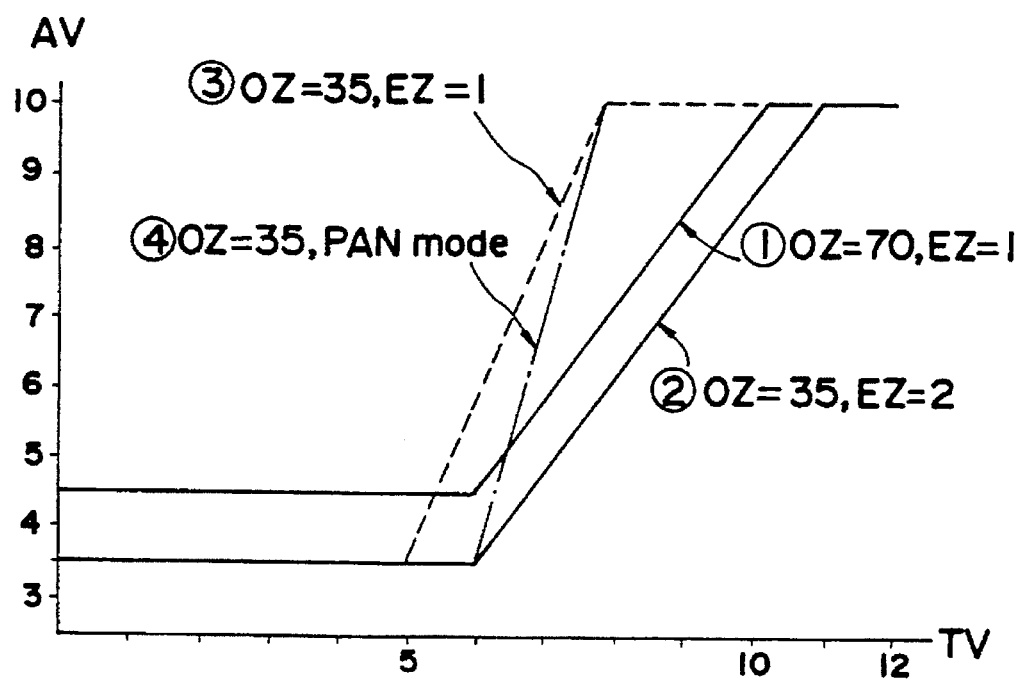

The second embodiment in the present invention is described with reference to FIG. 8B hereinafter.

Figure 7B:
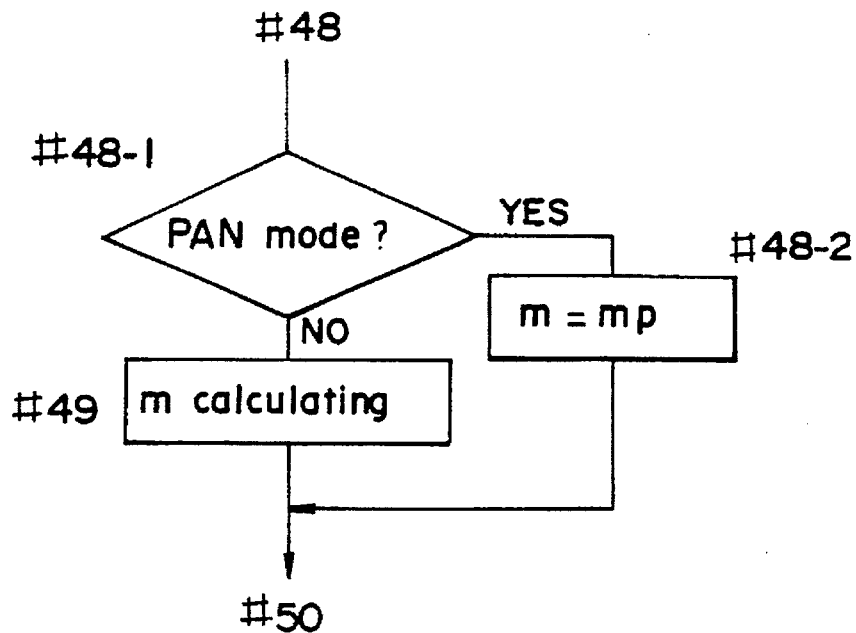
Figure 7C:
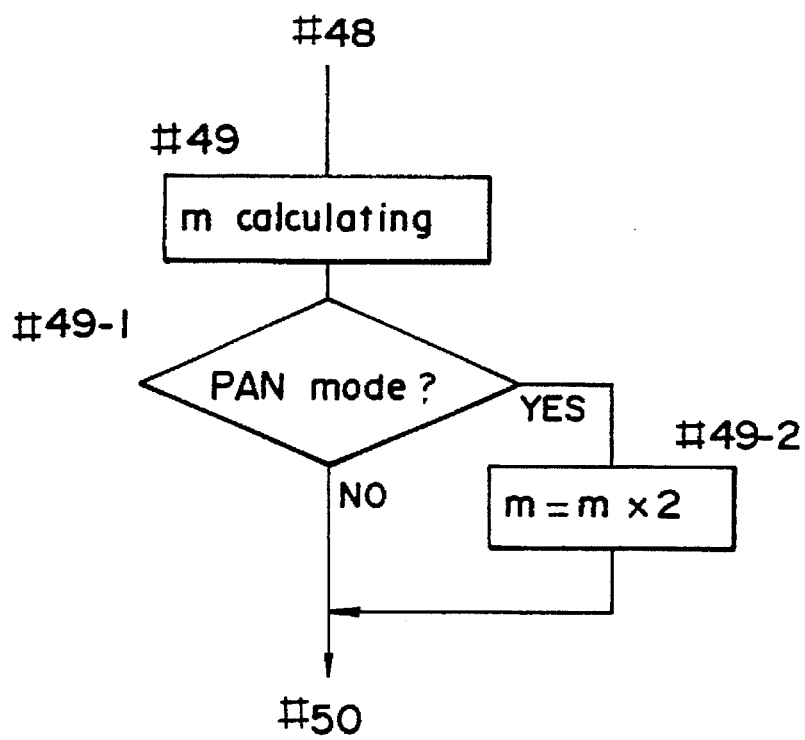

As described above, in panoramic photography, it is desirable to make the aperture small so that a depth of field will be deep. In the second embodiment, when the mode is the PAN mode, the value of the slope m is set so as to be larger than that of the other modes, For example, as shown in FIG. 7B, in the PAN mode, the slope m can be set at the predetermined slope mp which is larger than the slopes set in the other modes. The slope m also can be set double the slope calculated in the step #49 in the PAN mode, as shown in FIG. 7C. At this time, the program line is the line ④ shown in FIG. 8B.

In the present embodiment, the value of the slope m is set as shown in Table 2. But it is not only the specific values in Table 2 that are used. The divided ranges and numbers of the pseudo focal length fleq are also not fixed. A corresponding relation between the distance measuring area AF and the light measuring area BV is shown in FIG. 5. However, the present invention is executed in a camera of not only the above described embodiment, but also another embodiment in which a camera has a dividing light measuring portion where each light measuring area is provided so as to correspond to each distance measuring area of the multiple distance measuring portion.

Figure 9:
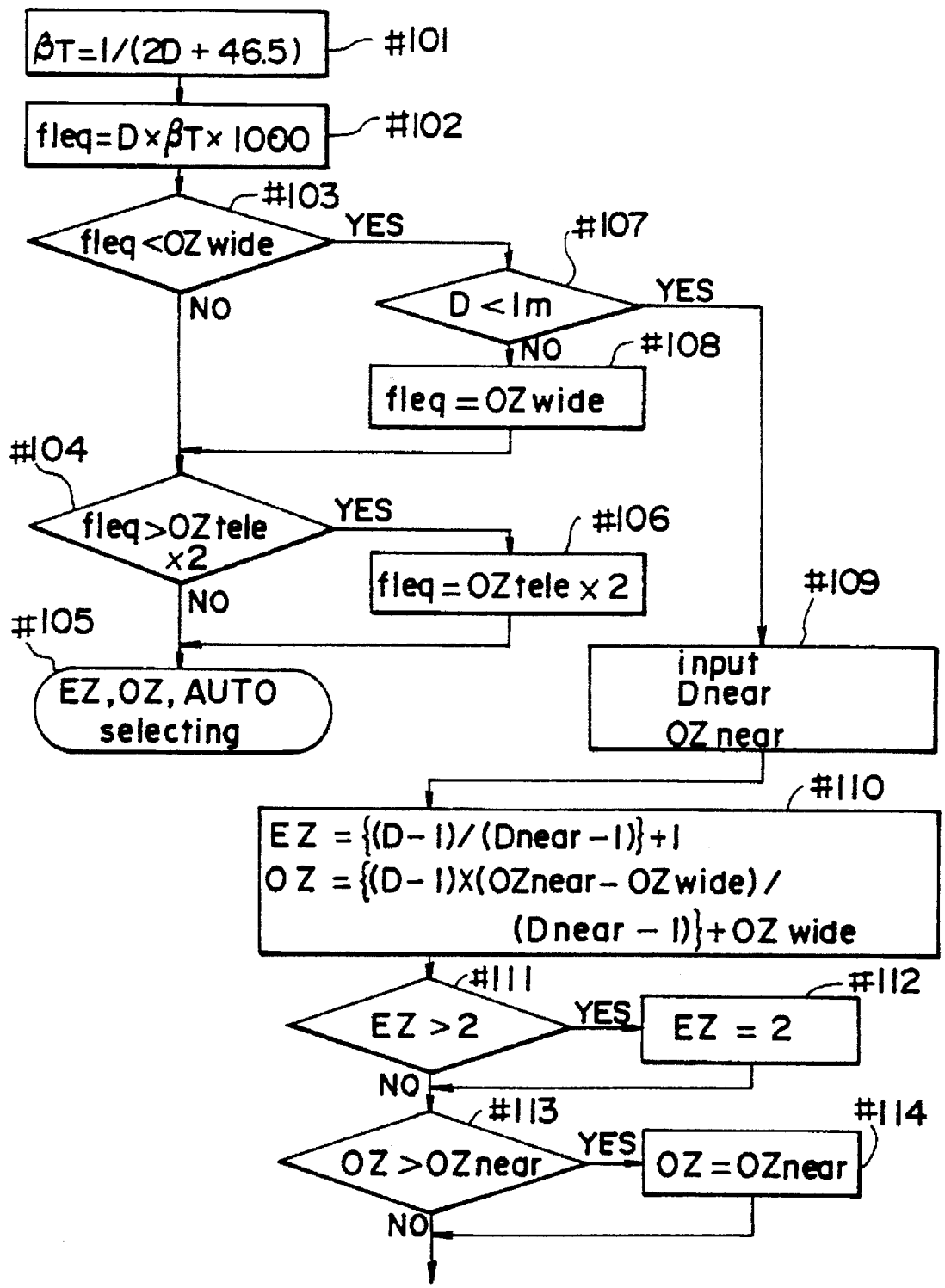
FIG. 9 is a flowchart showing a routine of an APZ mode.
Figure 10A:
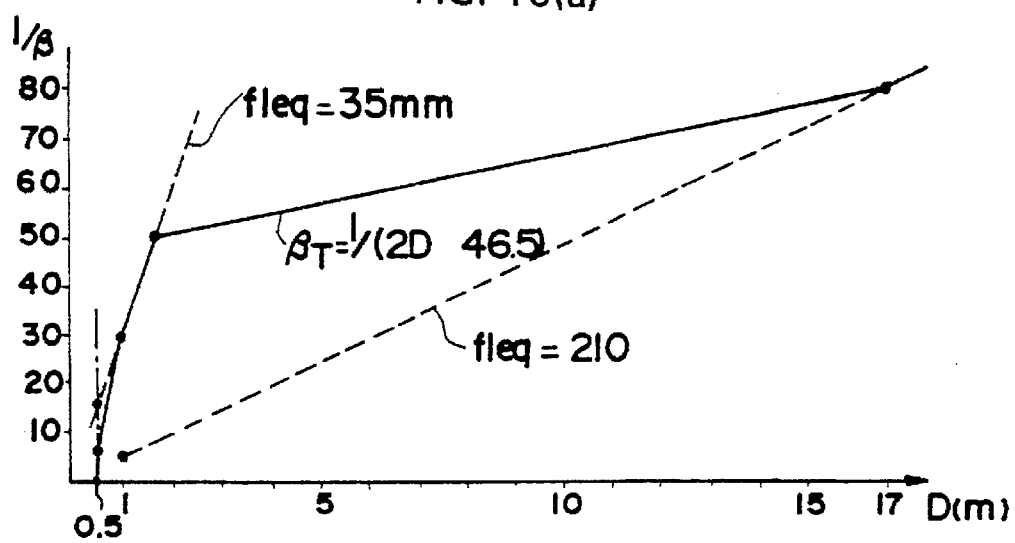
FIGS. 10a, b and c are graphs showing APZ lines in using a zoom lens whose characteristic is shown in FIG. 3.
Figure 10B:
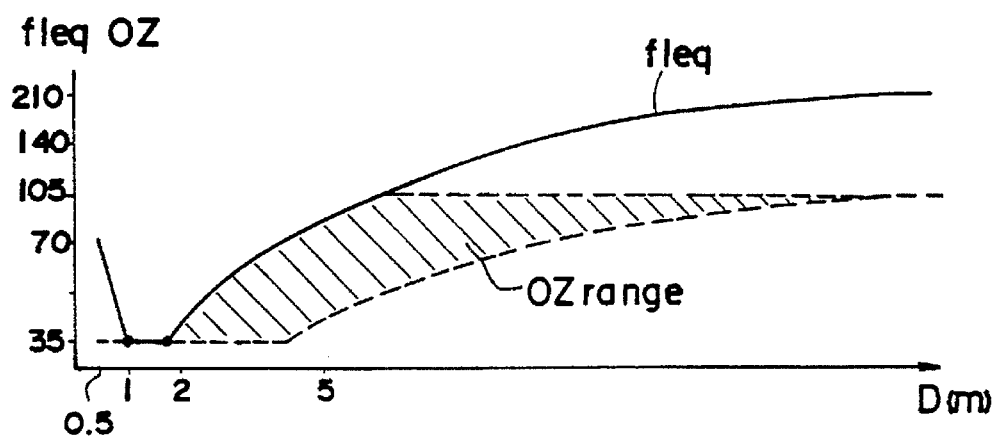
Figure 10C:
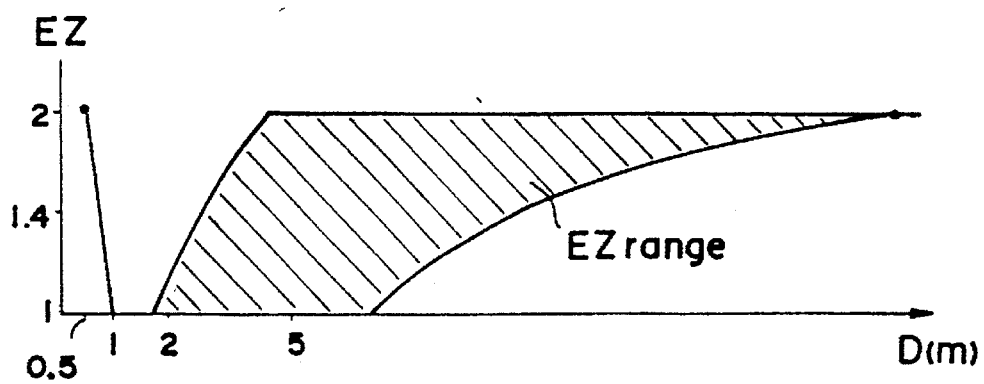

Further, the system shown in FIG. 1 has an APZ (Auto Program Zoom) mode under which the pseudo focal length fleq is automatically set at the best value according to the object distance. FIG. 9 is a flowchart showing a routine of the APZ mode. This routine is carried out before the EZ.OZ.PAN selecting routine shown in FIG. 4. FIG. 10 is a sequence of graphs showing APZ lines in using a zoom lens whose characteristic is shown in FIG. 3.

In FIG. 9, an ideal magnification value βt that is proper for portrait photography is calculated by the equation βt=1/(2D+46.5) in step #101. In the equation, D denotes an object distance. The value βt is almost 1/50 when D is less than 2 m, and is almost 1/80 when D is less than 17 m, for example. By calculating the ideal magnification in this way, βt becomes somewhat small when the object distance D is long, while βt becomes somewhat large when the object distance D is short.

In step #102, the ideal pseudo focal length fleq is calculated on the basis of the value βt. A range of the pseudo focal length fleq is from 35 mm to 210 mm in the embodiment shown in FIG. 5. When the pseudo focal length fleq, which is calculated based on the value βt, exceeds this range, the minimum value or the maximum value of the pseudo focal length fleq, that is, 35 mm or 210 mm is used. The EZ value and the OZ value are decided by the pseudo focal length fleq calculated in step #102 according to the routine of the AUTO mode in the EZ.OZ.PAN selecting routine shown in FIG. 4.

When the object distance is extremely short such as 1 m or less (that is, when it is a macro-photography distance), a determination is made that the photography is not portrait photography but macro-photography in which a small object is magnified. In this case, photography at a high magnification is required, as the camera approaches the object. However, if the APZ mode, which puts stress on a person, is selected (that is, the ideal pseudo focal length fleq is calculated in steps #101 and #102), OZ=OZwide and EZ=1 in the macro-photography distance, so that the magnification becomes, rather, small.

Recently, there has been provided an internal focusing type camera lens and a rear focusing type camera lens, whose lens shifting amounts by AF are reduced so that an AF routine can be processed fast. These are variable focus lenses whose image forming position changes according to the set focal length. The shortest photographing distance of some variable focus lenses becomes long from the wide angle side to the telephoto side. So, the shortest photographing distance Dnear and a focal length OZnear are inputted from a lens (such as a ROM built in a lens portion as described above) as information. Namely, the OZwide is inputted as the OZnear. The shortest photographing distance Dnear is a distance which is shortest in a range from the end of the wide angle side to the end of the telephoto side. In the focal length OZnear, the shortest photographing distance is the above-mentioned distance Dnear. In a lens whose shortest photographing distance does not change though its focal length changes like a front lens shifting type camera lens, the longest focal length is inputted as OZnear, that is, OZnear=OZtele.

Generally, in a lens of OZnear=OZwide such as a variable focus lens, the magnification is larger in the shortest distance at OZtele (hereinafter, referred to Dtnear) than in the shortest distance Dnear at OZwide. Therefore, it is better to set the OZ value at OZtele during macro-photography. When an object is within the Dtnear distance, it is not in focus with the setting at OZtele, but the focusing adjustment can be performed by shifting the OZ value to the wide angle side because Dnear<Dtnear. However, in this case, there occurs a problem that the magnification becomes small as the camera approaches the object. Then, in the present embodiment, in the macro-photographing distance, the OZ value is changed from OZwide into OZnear (when OZnear=OZwide, OZwide is used as it is), and the magnification of the electronic zooming is changed from EZ=1 into EZ=2. By such control, it becomes possible to photograph as far as the shortest photographing distance Dnear. And the nearer the object becomes, the larger the magnification becomes.

Returning to the flowchart in FIG. 9, in step #103, the calculated pseudo focal length fleq is compared with OZwide. When fleq≧OZwide (when step #103 is "NO"), the program goes to step #104 and the pseudo Focal length fleq is compared with the longest pseudo focal length OZtele×2. When fleq ≧OZtele×2 (when step #104 is "NO"), the program goes to step #105 which is the above described AUTO mode in the EZ.OZ.PAN selecting routine in FIG. 4. When fleq>OZtele×2 (when step #104 is "YES"), the pseudo focal length fleq is set at OZtele×2 (in step #106), and the program goes to step #105 of the AUTO mode.

When fleq<OZwide in the step #103, the program goes to step #107 and a determination is made whether or not the object distance D is within 1 m. When D≧1 (when step #107 is "NO"), the pseudo focal length fleq is set at OZwide (in step #108) and the program goes to step #104.

When D<1 m (when step #107 is "YES"), Dnear and OZnear are inputted from the camera lens as information of the shortest photographing distance as described above (in step #109). On the basis of this information, the EZ value and the OZ value are calculated by expressions shown in step #110. Namely, the EZ value is calculated by an addition of the value 1 and a ratio D−1/Dnear−1 (≧1) which expresses how near the object is to the camera from the distance 1 m. When the photographing distance D is Dnear, the EZ value is the maximum value 2. The OZ value is calculated by adding OZwide to the value of the product of OZnear −OZwide and the ratio D−1/Dnear−1. When the photographing distance D is Dnear, the OZ value corresponds with OZnear. When the EZ value calculated like this is over 2 (when step #111 is "YES"), the EZ value is set at 2 (in step #112). When the OZ value is over OZnear (when step #113 is "YES"), the OZ value is set at OZnear (in step #114). Then the program completes the EZ.OZ.PAN selecting routine.

FIG. 10 is a series of graphs of APZ lines in the case of using a zoom lens which has a characteristic shown in FIG. 3. In the APZ lines, the closest distance in wide angle photography is 0.5 m, and that of telephotography is 1.0 m. When D≧1 m, in portrait photography, a combination of the photographing distance and the magnification is set in advance so that the best magnification can be achieved for each photographing distance. The APZ line shown in FIG. 3 (a) shows this combination. When the photographing distance is less than 2 m, the pseudo focal length fleq is fixed at 35 mm. When the photographing distance is 17 m or more, the pseudo focal length fleq is fixed at 210 mm. When the pseudo focal length fleq calculated in step #102 is between 35 mm and 210 mm, there are many combinations of the OZ value and the EZ value at the calculated pseudo focal length fleq. That is, the best OZ value and the best EZ value can be selected in the areas shown with the slant lines in FIGS. 10 (b) and (c). When D<1 m, since the closest distance in wide angle photography is shorter, the conditions OZnear=OZwide and Dnear=0.5 are inputted from the lens (as described before, such as a ROM built in a lens) as information (in step #109). When D<1 m, as the photographing distance becomes near to Dnear, the OZ value is fixed at OZwide, while the EZ value is set so as to change linearly from 1 to 2, for example. Therefore, the pseudo focal length fleq changes from 35 mm to 70 mm in proportion to the photographing distance D. By such control, in macrophotography, the magnification βt smoothly becomes Large as the photographing distance becomes short.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraced therein.

What is claimed is:

1. A camera comprising:

a mode selector which selects one of a first mode in which a first partial range of an exposed image is to be printed and a second mode in which a second partial range of the exposed image is to be printed in a subsequent printing process, wherein the aspect ratio of said second range is different from that of said first range and said second range has a lateral size greater than that of said first range; and a calculation circuit which calculates an exposure value by means of an object brightness and the selected mode, wherein the aperture value of the second mode is greater than that of the first mode.

2. A camera as stated in claim 1, wherein said second mode has an exposure program line with an inclination which is greater than a program exposure line for the first mode.

3. A camera comprising:

a mode selector which selects one of a first mode in which a first partial range of an exposed image is to be printed and a second mode in which a second partial range of the exposed image is to be printed in a subsequent printing process, wherein said second range has a lateral size greater than that of said first range; and a calculation circuit which calculates an exposure value by means of an object brightness and the selected mode, wherein an exposure program line of the second mode has an inclination greater than that of the first mode.

4. A camera comprising:

a mode selector which selects one of a first mode in which a first partial range of an exposed image is to be printed and a second mode in which a second partial range of the exposed image is to be printed in a subsequent printing process, wherein the aspect ratio of said second range is different from that of said first range such that the width-to-height ratio of said second range is greater than that of said first range; and a calculation circuit which calculates an exposure value by means of an object brightness and the selected mode, wherein the aperture value of the second mode is greater than that of the first mode.

* * * * *